United States Patent [19]

Weise et al.

[11] 4,375,057
[45] Feb. 22, 1983

[54] POSITION SENSOR

[75] Inventors: Andrew P. Weise, Hebron; George R. Wisner, Deep River, both of Conn.

[73] Assignee: Otis Elevator Company, Farmington, Conn.

[21] Appl. No.: 215,205

[22] Filed: Dec. 10, 1980

[51] Int. Cl.³ ............................ B66B 3/02; G01S 1/24
[52] U.S. Cl. .................................. 340/21; 33/125 W; 324/58 R; 340/553; 340/686; 343/12 R
[58] Field of Search ................... 340/21, 19, 552, 553, 340/686, 21; 324/58 R; 33/125 W; 343/12 R, 112 D

[56] References Cited

U.S. PATENT DOCUMENTS

| 2,665,420 | 1/1954 | Winterhalter | 343/12 R |
| 2,947,985 | 8/1960 | Cooley | 343/112 D |
| 3,121,955 | 2/1964 | King | 33/125 W |
| 3,278,922 | 10/1966 | Andrews | 340/553 |
| 3,560,970 | 2/1971 | Kamimura et al. | 340/552 X |
| 4,041,495 | 8/1977 | Martin | 340/21 X |

Primary Examiner—David L. Trafton
Attorney, Agent, or Firm—Robert E. Greenstien

[57] ABSTRACT

Microwave signals are injected at one end of a slotted waveguide containing a shorting stub which is moved along the length of the waveguide. The distance to the shorting stub is determined from the comparative phase characteristics of the injected signals reflected back from the shorting stub.

3 Claims, 4 Drawing Figures

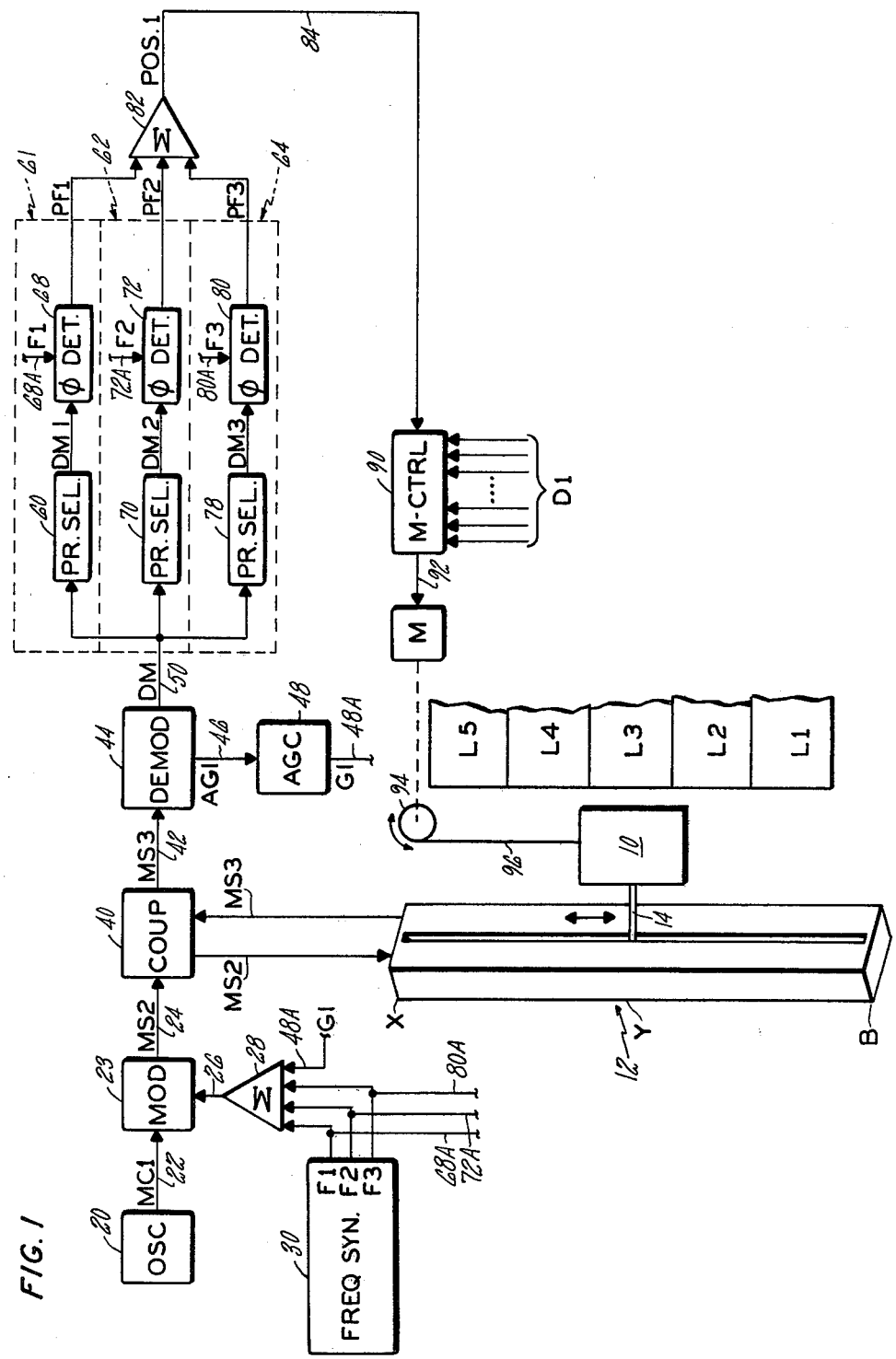

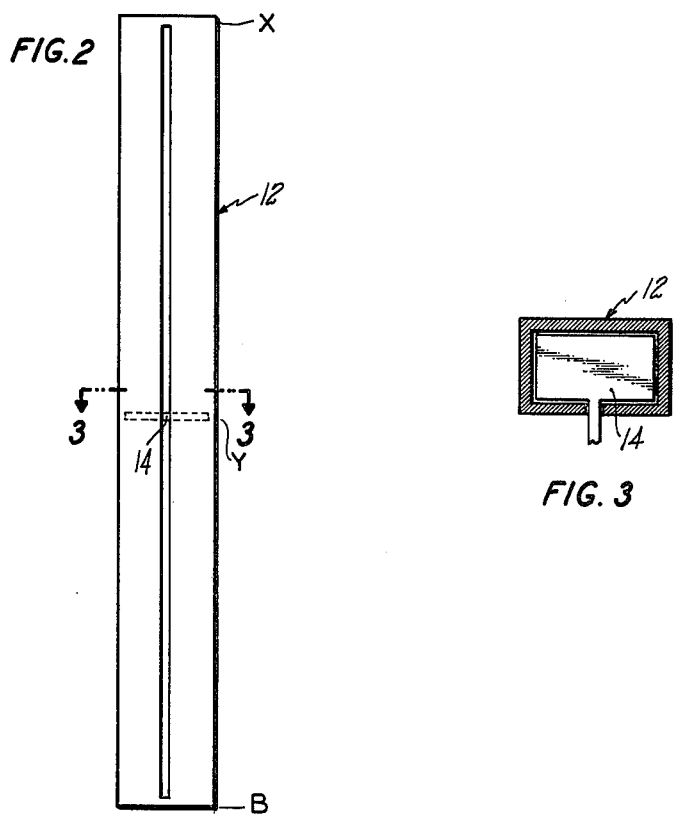
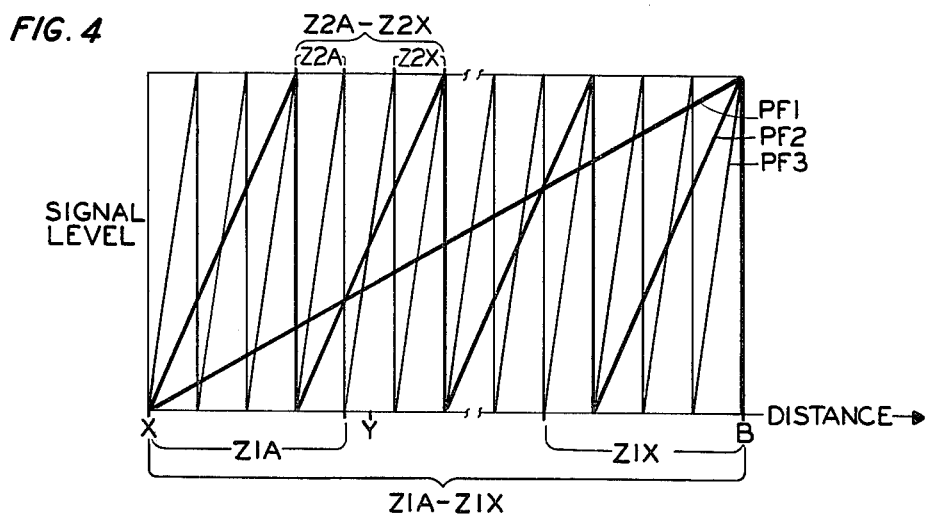

POSITION SENSOR

DESCRIPTION

1. Technical Field

This invention relates to position sensing or measuring devices.

2. Background Art

Position sensing or measuring devices, sometimes also known as position encoders, generally fall into three categories: the incremental type, the quasi-absolute type, and the absolute type.

The incremental type is nothing more than a counting apparatus which requires that the object being measured be moved from a zero or starting point to initiate counting.

The quasi-absolute type relies on relative changes from a previous position. The object under measurement must be moved some distance, but necessary from a zero starting point. U.S. Pat. No. 4,041,483 shows a quasi-absolute sensor or encoder.

The absolute type suffers from none of these limitations, being capable of determining position or distance without any object movement at all. As a result, in the event of a system power failure, the object's position is known, as soon as power is restored; the object does not have to be moved at all—unlike the incremental and quasi-absolute position sensors.

A significant application for position sensors is in elevator systems, where they are used to provide information indicating the location of the elevator car in the shaftway, for controlling car motion. One type of absolute encoder for these applications is shown in U.S. Pat. No. 3,963,098. It uses a perforated metal tape which extends the length of the shaftway. The perforations provide a unique numbering code for each position in the shaftway, and an optical tape reader, which rides on this tape, reads the code. A possible incremental sensor for elevators may consist simply of a perforated tape, such as the type used in the absolute encoder previously mentioned. But, in this case, the tape merely contains holes which are counted. The quasi-absolute encoder may also be used.

The absolute encoder is clearly the best way to provide position information in elevator systems. Among the reasons is that power failures are not a problem: at no time is the car "lost in the shaftway". The encoded tape arrangement, however, is extremely expensive and of questionable reliability, especially in extremely tall buildings, where the tape must be large enough to contain enough perforations to provide reasonably precise position information and must be very long.

DISCLOSURE OF INVENTION

An object of the present invention is to provide an ostensibly nonmechanical absolute position sensing arrangement, particularly suited for use in elevator systems and other applications.

According to the present invention, the location of the elevator car is determined by measuring phase changes associated with microwave signals reflected back at different positions in the shaftway. These microwave signals are injected into a slotted waveguide which extends the length of the shaftway. A shorting stub, located in this waveguide, is attached to the elevator car and slides in the waveguide as the car moves in the shaftway. The signals are reflected back from the shorting stub and the position of the car in the shaftway is determined from the resultant phase shift.

The present invention provides absolute position sensing apparatus having the attributes, particularly resolution, of a microwave sensing apparatus, but without the need to inject microwave unrestrained into the elevator shaftway. The microwaves instead are constrained in a medium, thus eliminating potential interference from the hoistway fixtures.

A feature of the present invention is that it provides an absolute sensing apparatus which, except for the shorting stub, has no moving parts, making it extremely reliable and mainly maintenance free.

Another feature is that thermal changes in the shaftway length do not affect the accuracy of the system because such changes similarly vary the propagation characteristics of the microwaves in the slotted waveguide in such a way that the changes have no effect. The system thus requires no adjustment for such changes.

BRIEF DESCRIPTION OF DRAWINGS

FIG. 1 is a block diagram of an elevator system using a microwave sensing apparatus according to the present invention.

FIG. 2 is a view from the side of a portion of the slotted waveguide used in the position sensing apparatus according to the present invention.

FIG. 3 is a cross-sectional view along the line 3—3 in FIG. 2.

FIG. 4 is a graph of phase detector output level vs. distance for three microwave signals having different frequencies.

BEST MODE FOR CARRYING OUT THE INVENTION

As stated, the present invention is particularly useful for elevator systems, but no doubt will have other applications. Thus, for explanatory purposes, FIG. 1 shows a very simplified elevator system employing a microwave position sensing apparatus according to the present invention.

The system in FIG. 1 includes an elevator car 10 which rides in a shaftway on rails (not shown) between a number of floors L1–L5. Extending the length of this shaftway is a slotted waveguide 12 which contains a sliding short or stub 14 which provides a movable barrier within the inner cavity of the waveguide (see FIGS. 2, 3). This shorting stub moves along with the car as the car moves within the shaftway.

A composite microwave signal MS2 is injected into the waveguide and is reflected back from this shorting stub 14, forming a composite reflected microwave signal MS3. By sensing the phase characteristics of the reflected signal and the distance between the beginning X of the waveguide and the shorting stub location Y is determined, thereby providing an indication of the location of the car 10 in the shaftway.

To produce the composite signal MS2, the apparatus uses a microwave source 20, which provides a microwave carrier signal MC1 over a line 22 to a modulator circuit 23 which produces the composite signal MS2 over a line 24 in response to the carrier signal MC1 and the output over a line 26, from a variable gain summing circuit 28 which provides three modulating signals F1, F2, F3. The input to this summing circuit includes those three modulating signals F1, F2 and F3, which are supplied from an oscillator or frequency synthesizer 30, and a signal G1 which is supplied from an AGC circuit in order to maintain the level of signal MS3 as constant as possible. The frequency of the modulating signals F2 and F3 are interrelated. At least one of these signals, e.g. F1, has a frequency which has a wavelength whose period equals the round trip transmission time for the signals MS2 and MS3, as defined by this equation (1).

$$Vg = C\sqrt{1 - \left(\frac{\lambda}{2X}\right)^2} \quad (1)$$

where:
Vg = group velocity
λ = wavelength in free space
X = waveguide width (2)
C = speed of light and assuming waveguide cut-off occurs when $$\frac{\lambda}{2X} \geq 1 \quad (2)$$

and frequency ratios of 1.5 and group velocities in the range of 0.6C to 0.87C. For example, assuming a waveguide cut-off ratio of 0.58 and a group velocity of 0.8146C, the transmission time for a 1500' measurement range, e.g. a 1500' elevator shaft, is 3.7416 microseconds. This time corresponds to the period of a frequency of 267.26 KHZ, and this should be the frequency of the signal F1 so as to provide an unambiguous measurement range of 1500 feet. Assuming the capability to resolve the phase of that signal F1 within 10 degrees, the corresponding distance resolution is 41.67 feet. To provide greater resolution the other modulating frequencies F2 and F3 are respectively higher than F1, preferably by orders of magnitude. F2 may be 2.6726 MHZ, thus providing an umambiguous measurement up to 150 feet and resolving to within 4.167 feet, assuming 10 degree phase resolution capability. The highest modulating frequency may be 26.726 MHZ to provide an unambiguous measurement range of 15 feet, a resolution to within 0.416 to 0.0416 inches, assuming the capability to resolve between 1 and 0.1 degrees phase shaft, which is easily obtainable using known techniques.

The output from the summing amplifier on the line 26 is a composite signal CS1 which consists of three modulating signals F1, F2 and F3 whose magnitudes are adjusted in proportion to the gain control signal G1. The signal MS2 provided by the modulator 23, as a result, is the carrier signal MS1 displaced by the frequencies F1, F2 and F3, in other words, the carrier signal MS1, at a frequency FMC1, plus associated upper and lower sidebands. Thus, the signal MS2 consists of signals having frequencies FMC1±F1, FMC1±F2, and FMC1±F3, and the carrier signal MS1, at the frequency FMC1. However, other modulation techniques may be used, such as sidebanding, carrier suppression, frequency modulation and pulse modulation. All of these techniques are well known and understood for this type of application.

The signal MS2 is supplied to a bidirectional microwave decoupling apparatus 40 which couples the signal MS2 to the waveguide where it propagates down and is reflected back from the sliding short 14, thus forming the return signal MS3. The return signal MS3 is supplied to the same directional coupling device 40 from which it exits over a line 42 connected to an envelope or AM detector 44. The AM detector produces a first output signal AG1 over a line 46 to an AGC circuit 48 for producing the signal G1 which reflects the average level of the signal MS3. As stated, the signal G1 is used to adjust the level of the signal MS2 to be as constant as possible, to likewise maintain the signal MS3 as constant as possible, and this is important since the distance measurement is made by comparing the respective phases of the signals comprising the signal MS3, in the manner as stated later herein.

The reflected signal MS3 consists of the previously mentioned seven signals which make up the signal MS2; however, the phase relationship between the signals MS2 and MS3 is different as a result of their reflection back from the shorting stub 14 and manifests the distance between X and Y. To decipher that distance, the envelope detector 44 removes the carrier signal MS1 from the reflected signals, producing, on its output line 50, a demodulation signal DM consisting of three demodulation signals DM1–DM3 wihch are correspondingly at the frequencies of the modulating signals F1–F3, but phase shifted relative to them. As stated, this phase shift minifests the distance between X and Y on the waveguide, in other words, the location of the car 10.

In order to detect this phase relationship and determine the position therefrom, the signal DM is supplied to detector circuits 60, 62 and 64. The detector circuit 60 includes a preselector 66 which is tuned to the frequency of F1 in order to eliminate the signals comprising the signal DM. The output from this preselector is supplied over a line to a phase detector 68 which receives over a line 68A a reference signal comprising the signal F1 from the modulator oscillator 30. The phase detector compares the phase of the modulating signal F1 with the output from the preselector 66, to provide a DC signal PF1 which is proportional to that phase relationship.

The signal DM is likewise supplied to the detector circuit 62 which includes a preselector 70 tuned to the frequency F2. The preselector output is supplied to a phase detector 72 which produces a signal PF2 which is proportional to the phase relationship between the preselector output signal and the modulating signal F2 which is supplied over a line 72A from the synthesizer 30.

The signal DM is also supplied to a preselector 78 in the detector 64. This preselector 78 is tuned to the frequency F3 and produces an output which is supplied to a phase detector 80 where it is compared with the modulating signal F3, supplied over a line 80A, in order to produce a signal PF3 which is proportional to the phase difference between the preselector 78 output and the modulating signal F3.

The three signals PF1, PF2 and PF3 are supplied to a selective summing circuit 82, which may be analog or digital, for providing a composite signal POS1 indicating the position of the car 10. As FIG. 4 shows, each signal PF1, PF2, PF3 reflects the distance with respect to the unambiguous distance measuring capability of its corresponding modulating signal. It will be noted there that only the signal PF1 provides a unique level output for each position along the waveguide. But, since only the signal PF1 provides an absolute, unambiguous position indication along the waveguide (but with poor resolution), the ambiguity of the other signals PF2 and PF3 must be eliminated in order to obtain the resolution they provide. The circuit 82 eliminates this ambiguity associated with the signals PF2 and PF3 by dividing the signal PF1 into a number of distance zones Z1A-Z1X. Each of these zones reflects (by nature of the frequency of signal F1, as explained previously) an unambiguous position range between the locations X and B on the guide. From this the circuit then identifies the range increment associated with the level of the signal PF2, thus removing the ambiguity associated with the signal PF2. In a similar manner, the signal PF2 is divided into zones Z2A-Z2X, thus identifying the range increment associated with the level of the signal PF3. This process may be done through analog or digital techniques, the latter including microprocessor utilization. In this way, the circuit 82 produces a position signal, the signal POS1, which has the precise resolution capability of the highest frequency signals F3, yet the unambiguous measuring capability of the lower frequency F1.

As shown in FIG. 1, the position signal POS1 is supplied over a line 88 to an elevator motion controller 90 which also receives over a plurality of lines D1 other signals for use in controlling the car's operation. The output from this controller 90 is supplied over a line 92 to the elevator motor M which is mechanically connected by a sheave 94 to the elevator car hoistway ropes 96 for moving the car in the shaftway in accordance with the signals supplied from the controller 90 over the line 92.

A significant characteristic of this apparatus is that as the length of the waveguide 12 increases, for example due to thermal expansion, there is no change in the output from the position signal POS1, and this results from the fact that as the length of the waveguide increases thermally, so does its width, and so the group velocity also increases in proportion (see equation (1), supra). The round trip transmission time thus decreases and, consequently, there is no phase change between the signals comprising signals MS2 and MS3. Thus, there is no change in the signal POS1; hence, the car is sensed to be at the same relative position, despite the thermal change.

In order to select the frequencies F1, F2 and F3, first the physical size of the waveguide must be determined according to the foregoing equations. It has been found, however, that in order to minimize losses through the slot and at the same time have the slot wide enough to facilitate car to stub attachment, the frequency should be as low as possible.

Resolution can be increased further by comparing the phase relationship of the inputted and reflected signal MS3 and augmenting the POS1 signal accordingly. For example, if a 3.585 GHZ microwave carrier is injected into a 2.84 inch wide waveguide, the wavelength in the guide is 6.82 centimeters, and if the carrier phase can be resolved to within 10 degrees, the hoistway length can then be resolved to within 1.89 millimeters or 0.074 inches.

Although it was not shown (in order to facilitate explanation of the invention), the detectors 60, 62 and 64 may include identically tuned phase detectors 68, 72 and 80. This would require, following preselection by the preselectors 66, 70 and 78, conversion of the preselector output to a lower intermediate (IF) frequency to which each of the phase detectors is tuned. Each phase detector 68, 72 and 80, however, will receive a respective reference signal in place of the signal F1, F2 and F3 respectively applied thereto. These reference signals would then comprise corresponding IF signals for the signals F1, F2 and F3 produced by the synthesizer 30. This "down conversion process" allows for the use of identical phase detectors 68, 72 and 80, as mentioned previously, and thus some simplification. It should be noted that the down conversion process still preserves the phase shift that occurred at the higher frequencies F1, F2 and F3. That is, a phase shifted 80° at approximately 27 MHZ (using the foregoing example) when down converted to an IF frequency of 10 KHZ still remains 80° at that IF frequency.

In order to minimize waveguide attenuation the waveguide preferably should have an inside width to height dimension ratio of 2 to 1 and be operated in the $TE_{10}$ mode. A suitable waveguide can be constructed of drawn rectangular aluminum sections joined in the field by known welding techniques. Such sections are typically inexpensive. The section joints should be as smooth as possible in order to minimize microwave distortion, which could potentially effect the system accuracy. In typical cases it is best to maintain a 20 db ratio between the reflections from the shorting stub and the reflections from the joints.

The slot down in FIGS. 2 and 3 is located midway along the guide width because this is the zero point for the guide operated in the $TE_{10}$ mode. The slot thus produces very small losses when the guide is operated in that mode. A wide slot is required, as stated previously, to provide a strong attachment link between the stub and the car 10. The indicated slot location satisfies both criteria.

While the foregoing is a description of the best mode for carrying out the invention, nevertheless, to one skilled in the art there may be variations, modifications, substitutions and alterations that can be made to what has been shown and described in the foregoing without departing from the true scope and spirit of the invention embodied therein.

We claim:

1. Apparatus for sensing the distance to an object, characterized by:
   a microwave signal source,
   a contained medium for propagating microwave signals along its length, said medium including a reflector member along the length of the medium for reflecting the signals back, and
   detection means responsive to input signals for providing an output signal which reflects the phase difference between said input signal and a reference signal,
   said signal from said microwave source being applied to said medium, said input signal being a signal reflected back from the reflector member and said reference signal being said microwave signal, the object being connected to said reflector member, and
   said microwave source comprising means for providing a microwave signal comprising at least first and second modulated signals, the modulating frequency of one of said signals being such that its period, for one cycle, equals the round trip transmission time for the carrier for the maximum distance to be measured and the modulation frequency of the second frequency being higher than said first frequency,
   said detection means comprising means responsive to an input signal comprising said second signal for providing a demodulation signal reflecting the modulated portion, if any, of said input signal, means for providing a first distance indicating signal reflecting the phase difference between said demodulation signal and a first reference signal having the same frequency as said first modulation signal, means for providing a second distance indicating signal reflecting the phase difference between said demodulation signal and a reference signal having the same frequency as said second modulation signal, and for providing a signal reflecting the sum of the distances associated with said distance signals.

2. The apparatus according to claim 1, characterized in that said medium comprises a slotted waveguide containing a slot extending its length and a shorting stub within the waveguide cavity, said shorting stub being connected to the object being measured and movable within the waveguide.

3. An elevator system comprising a car movable in a hoistway, car motion control apparatus and car position encoding apparatus for providing a signal reflecting car position for use by the control apparatus, characterized in that the encoding apparatus comprises:

a microwave signal source, a contained medium for propagating microwave signals along its length, said medium including a reflector member along the length of the medium for reflecting the signals back, and detection means responsive to input signals for providing an output signal which reflects the phase difference between said input signal and a reference signal, said signal from said microwave source being applied to said medium, said input signal being the signal reflected back from the reflector in said medium and said reference signal being said microwave signal, said medium extending in a hoistway in the direction of car movement, said reflector member being coupled to the car, said medium comprising a slotted waveguide containing a shorting stub therein, said shorting stub being connected to the object being measured and movable within the waveguide, said microwave source comprising means for providing a microwave signal comprising at least first and second modulated signals, the modulation frequency of one of said signals being such that its period, for one cycle, equals the round trip transmission time for the carrier for the maximum distance to be measured and the modulation frequency of the second frequency being higher than said first frequency, and said detection means comprising means responsive to an input signal comprising said second signal for providing a demodulation signal reflecting the modulated portion, if any, of said input signal, means for providing a first distance indicating signal reflecting the phase difference between said demodulation signal and a first reference signal having the same frequency as said first modulation signal, means for providing a second distance indicating signal reflecting the phase difference between said demodulation signal and a reference signal having the same frequency as said second modulation signal and means for providing a signal reflecting the sum of the distances associated with said distance signals.

* * * * *

UNITED STATES PATENT AND TRADEMARK OFFICE
CERTIFICATE OF CORRECTION

PATENT NO.   : 4,375,057
DATED        : February 22, 1983
INVENTOR(S)  : Andrew P. Weise, et al It is certified that error appears in the above-identified patent and that said Letters Patent is hereby corrected as shown below:

Cover Page, in the Drawing, "60" should read --66--, and "61" should read --60--.

In the Drawings, Sheet 1 of 2, Fig. 1, "60" should read --66--, and "61" should read --60--.

Column 3, line 44, "shaft" should read --shift--.

Column 6, line 23, "down" should read --shown--.

Signed and Sealed this

Fifth Day of July 1983

[SEAL]

Attest:

Attesting Officer

GERALD J. MOSSINGHOFF

Commissioner of Patents and Trademarks